(12) United States Patent
Bubnjic

(10) Patent No.: US 11,198,057 B2
(45) Date of Patent: Dec. 14, 2021

(54) GAMING APPARATUS FOR SPINNING TOP TOY GAME

(71) Applicant: Relax Support, LLC, Sheridan, WY (US)

(72) Inventor: Darko Bubnjic, Crnomelj (SI)

(73) Assignee: Relax Support, LLC, Sheridan, WY (US)

( * ) Notice: Subject to any disclaimer, the term of this patent is extended or adjusted under 35 U.S.C. 154(b) by 87 days.

(21) Appl. No.: 16/727,905

(22) Filed: Dec. 26, 2019

(65) Prior Publication Data

US 2021/0197071 A1    Jul. 1, 2021

(51) Int. Cl.
| | |
|---|---|
| *A63F 9/24* | (2006.01) |
| *A63F 11/00* | (2006.01) |
| *G06F 13/00* | (2006.01) |
| *G06F 17/00* | (2019.01) |
| *A63F 9/16* | (2006.01) |
| *A63F 13/52* | (2014.01) |

(52) U.S. Cl.
CPC ............... *A63F 9/16* (2013.01); *A63F 13/52* (2014.09); *A63F 2300/69* (2013.01)

(58) Field of Classification Search
USPC ..................................... 463/7, 10, 12, 20, 39
See application file for complete search history.

(56) References Cited

U.S. PATENT DOCUMENTS

| | | | |
|---|---|---|---|
| 4,142,725 A | | 3/1979 | Gilbert et al. |
| 4,600,398 A | | 7/1986 | Fraga |
| 5,450,841 A | * | 9/1995 | Whitaker |
| 5,591,062 A | | 1/1997 | Hettinger |
| 5,971,830 A | * | 10/1999 | Tobin |
| 6,604,978 B1 | | 8/2003 | Abel |
| 6,905,389 B2 | | 6/2005 | Matsukawa |
| 2007/0021029 A1 | | 1/2007 | Weidetz et al. |
| 2015/0343318 A1 | * | 12/2015 | Liang |
| 2019/0105576 A1 | | 12/2019 | Muraki et al. |

FOREIGN PATENT DOCUMENTS

| | | | |
|---|---|---|---|
| JP | 48-88194 U | * | 10/1973 |
| JP | 4888194 | | 10/1973 |
| JP | 55-101191 U | * | 7/1980 |
| JP | 55101191 | | 7/1980 |

* cited by examiner

*Primary Examiner* — Adetokunbo O Torimiro
(74) *Attorney, Agent, or Firm* — Kanika Radhakrishnan; Evergreen Valley Law Group

(57) ABSTRACT

The present disclosure provides an apparatus for spinning top toy games. The apparatus includes a playing path for playing the spinning top toy game. The playing path is either a virtual playing path customized using one or more augmented reality (AR) elements rendered by an application of a user device or a physical playing path configured on a gaming board or a suitable surface using at least one pre-prepared section. A spinning top used a gaming component for playing the spinning top toy game and configured to achieve a rotational motion around a central axis thereof. A blower device configured to drive air through an air outlet port from an air inlet port. A user operates the blower device for driving air to the spinning top thereby resulting in a rotational of the spinning top and manoeuvres the spinning top along the playing path.

20 Claims, 13 Drawing Sheets

GAMING APPARATUS FOR SPINNING TOP TOY GAME

TECHNICAL FIELD

The present disclosure relates generally to a spinning toy top game and, more particularly to, spinning toy top game using a blower device for guiding the spinning top on a customizable playing arena.

BACKGROUND

In the recent past, the spinning top is a preferred toy among young children because the young children are interested and amused in watching the spinning top's movements. The spinning top is used by the young children and adults for playing various games in which they compete by testing their skills in maintaining the spinning top in motion. The rotation of the spinning top is provided by using conventional methods such as providing a thin stem on the top surface of the spinning top or by a string wound around the spinning top.

Over time, improvisation is seen in the way a rotational movement is imparted to the spinning top. Therefore, a little more challenging games have developed which use the spinning top as a gaming component for playing the games. One such game is a maze game configured with a pre-prepared path on a maze board. In this game, a player has to guide the spinning top along the pre-prepared path for completing the maze game before the spinning top is exhausted. The guiding or manipulation of the spinning top for completing the maze game may be provided by manually tilting the maze board. The manual tilting of the maze board by the player may result in the reduction of speed of the spinning top. In some instances, the player may attempt numerous times for completing the maze game due to the above-aforementioned reason. Also, the player may experience apathetic condition upon achieving the skill level for playing the maze game on the pre-prepared path of the maze board using the spinning top.

Therefore, there exists a need for techniques for playing the maze game using the spin top, which can overcome one or more limitations stated above in addition to providing other technical advantages.

The information disclosed in this background section is only for enhancement of understanding of the general background of the invention and should not be considered as an acknowledgment that this information forms the prior art already known to a person skilled in the art.

SUMMARY

Various embodiments of the present disclosure provide a gaming apparatus for spinning top toy game. The gaming apparatus includes a playing path for playing the spinning top toy game by a user. The playing path includes at least one of a virtual playing path configured in a computer-implemented application of a user device and a physical playing path configured by using at least one pre-prepared section. A spinning top includes a top segment and a bottom segment. The top segment is configured to drive air around a central axis of the spinning top thereby controlling radial direction of rotational motion of the spinning top. The bottom segment is configured for serving as a spinning point of the spinning top relative to a surface. A blower device includes an air inlet port and an air outlet port. The blower device is configured to drive air to the spinning top through the air outlet port for providing the rotational motion and manoeuvring of the spinning top by the user. The rotational motion of the spinning top is achieved upon driving air onto the top segment of the spinning top through the air outlet port of the blower device. The air impacting the top segment creates air pressure due to velocity at a central portion of the spinning top which results in the rotational motion of the spinning top around the central axis thereof.

In an embodiment, the present disclosure provides the gaming apparatus for the spinning top toy game. The gaming apparatus for the spinning top toy game includes the playing path for playing the spinning top toy game by the user. The playing path includes at least one of the virtual playing and the physical playing path. The virtual playing path is configured in the computer-implemented application of the user device using one or more augmented reality (AR) elements rendered on an interface of the computer-implemented application in the user device. The physical playing path is configured using the at least one pre-prepared section. The spinning top includes the top segment and the bottom segment. The top segment is configured to drive air around the central axis thereby controlling radial direction of the rotational motion of the spinning top. The bottom segment is configured for serving as the spinning point of the spinning top relative to the surface. The blower device includes the air inlet port and the air outlet port. The blower device is configured to drive air to the spinning top through the air outlet port for providing the rotational motion and manoeuvring of the spinning top by the user. The rotational motion of the spinning top is achieved upon driving air onto the top segment of the spinning top through the air outlet port of the blower device. The air impacting the top segment creates air pressure due to velocity at the central portion of the spinning top which results in the rotational motion of the spinning top around the central axis thereof. The manoeuvring of the spinning top is achieved upon driving air towards edge of the top segment of the spinning top thereby resulting the velocity of air blown on the top segment to increase which enables the spinning top to traverse.

In another embodiment, the present disclosure provides the gaming apparatus for the spinning top toy game. The gaming apparatus for the spinning top toy game includes the physical playing path for playing the spinning top toy game by the user. The physical playing path is configured by at least removably coupling the at least one pre-prepared section on a gaming board and/or removably coupling the at least one pre-prepared section by engaging a plurality of engagement members with a plurality of slot members configured on at least one side surface of the at least one pre-prepared section. The spinning top includes the top segment and the bottom segment. The top segment is configured to drive air around the central axis thereby controlling radial direction of the rotational motion of the spinning top. The bottom segment is configured for serving as the spinning point of the spinning top relative to the surface. The blower device includes the air inlet port and the air outlet port. The blower device is configured to drive air to the spinning top through the air outlet port for providing the rotational motion and manoeuvring of the spinning top by the user. The rotational motion of the spinning top is achieved upon driving air onto the top segment of the spinning top through the air outlet port of the blower device. The air impacting the top segment creates air pressure due to velocity at the central portion of the spinning top which results in the rotational motion of the spinning top around the central axis thereof. The manoeuvring of the spinning top is achieved upon driving air towards the edge of the top segment of the spinning top thereby resulting the velocity of air blown on the top segment to increase which enables the spinning top to traverse.

BRIEF DESCRIPTION OF THE FIGURES

The following detailed description of illustrative embodiments is better understood when read in conjunction with the appended drawings. For the purpose of illustrating the present disclosure, exemplary constructions of the disclosure are shown in the drawings. However, the present disclosure is not limited to a specific device or a tool and instrumentalities disclosed herein. Moreover, those in the art will understand that the drawings are not to scale. Wherever possible, like elements have been indicated by identical numbers.

Figure 1A:
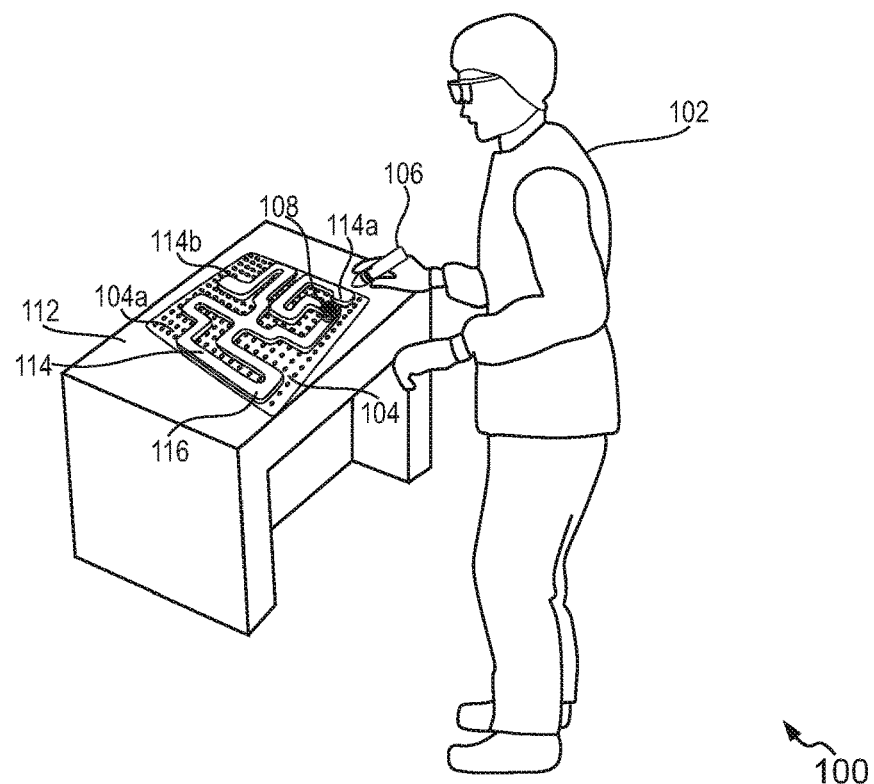
FIG. 1A illustrates an example representation of environment for playing spinning top toy game, in accordance with an example embodiment of the present disclosure.

The drawings referred to in this description are not to be understood as being drawn to scale except if specifically noted, and such drawings are only exemplary in nature.

DETAILED DESCRIPTION

In the following description, for purposes of explanation, numerous specific details are set forth in order to provide a thorough understanding of the present disclosure. It will be apparent, however, to one skilled in the art that the present disclosure can be practiced without these specific details. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Reference in this specification to "one embodiment" or "an embodiment" means that a particular feature, structure, or characteristic described in connection with the embodiment is included in at least one embodiment of the present disclosure. The appearance of the phrase "in an embodiment" in various places in the specification is not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

Moreover, although the following description contains many specifics for the purposes of illustration, anyone skilled in the art will appreciate that many variations and/or alterations to said details are within the scope of the present disclosure. Similarly, although many of the features of the present disclosure are described in terms of each other, or in conjunction with each other, one skilled in the art will appreciate that many of these features can be provided independently of other features. Accordingly, this description of the present disclosure is set forth without any loss of generality to, and without imposing limitations upon, the present disclosure.

Overview

Various embodiments of the present disclosure provide an apparatus for playing a spinning top toy game. A spinning top is used as a gaming component for playing the spinning top toy game. The spinning top is configured to achieve a rotational motion on a surface. A blower device is configured to drive air onto the spinning top through an air outlet port of the blower device by taking intake air from the air inlet port of the blower device. Further, rotational motion and direction of movement of the spinning top may be regulated by operating the blower device suitably i.e. applying the air forced from the blower device onto the spinning top. The rotational motion of the spinning top persists as long as the blower device drives air on the top segment of the spinning top. A playing path can be customized by a user for playing the spinning top toy game. The playing path may be at least a physical playing path and/or a virtual playing path. The physical playing path is configured by removably mounting at least one pre-prepared section on a gaming board. Further, the physical playing path can be customized without the gaming board by removably connecting the pre-prepared sections. The physical playing path customized by removably connecting the pre-prepared sections is placed on the surface for playing the game.

The user playing the spinning top toy game operates the blower device which drives air onto the top segment of the spinning top. The air forced on the top segment creates sufficient air pressure resulting in a rotational motion of the spinning top around a central axis thereof. The rotational motion of the spinning top in either a left rotation or a right rotation depends on the velocity of the air blown from the blower device and shape of the spinning top. The velocity of air blown onto a central portion of the top segment determines the direction of the rotational motion of the spinning top. Further, the velocity of air blown on the top segment of the spinning top includes two perpendicular components. The perpendicular components are inherently connected with force using classical mechanics which enables the rotational motion and controlling the direction of movement of the spinning top on the surface. Upon achieving the rotational motion, the user can manoeuvre the spinning top along the physical playing path (or any surface that enables spinning (water, ice, flat surface etc.) by operating the blower device.

Additionally or alternatively, the user may play the game on an application installed in the user device. The user may customize the virtual playing path using the one or more Augmented Reality (AR) elements rendered by the application or a pre-defined virtual playing path is provided to the user based on the user input in the application. Upon customization or selection of the virtual playing path by the user, a virtual spinning top is placed at an initial point and configured to assume a playing mode. In the playing mode, an image capturing module of the user device is triggered for detecting the rotational motion and the direction of movement of the spinning top on the surface. The user operating the blower device manoeuvres the spinning top on the surface corresponding to the virtual playing path. As such, the direction of movement and the rotational motion of the spinning top are manipulated by the virtual spinning top and manoeuvres along the virtual playing path This configuration of the present invention provides a user-customizable playing path for playing the spinning top toy game and controlling the speed of the spinning top based on speed regulation of the air blower. The term "spinning top toy game" and "game" are interchangeably used throughout the present description.

Figure 1B:
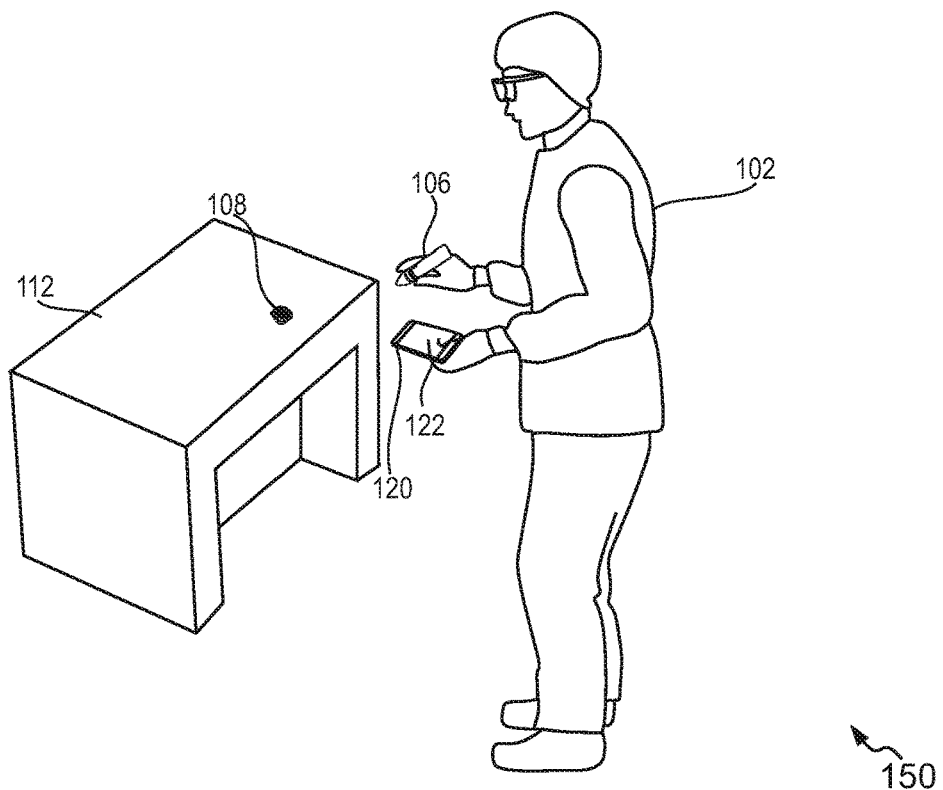
FIG. 1B illustrates an example representation of environment for playing the spinning top toy game, in accordance with another example embodiment of the present disclosure.
Figure 6:
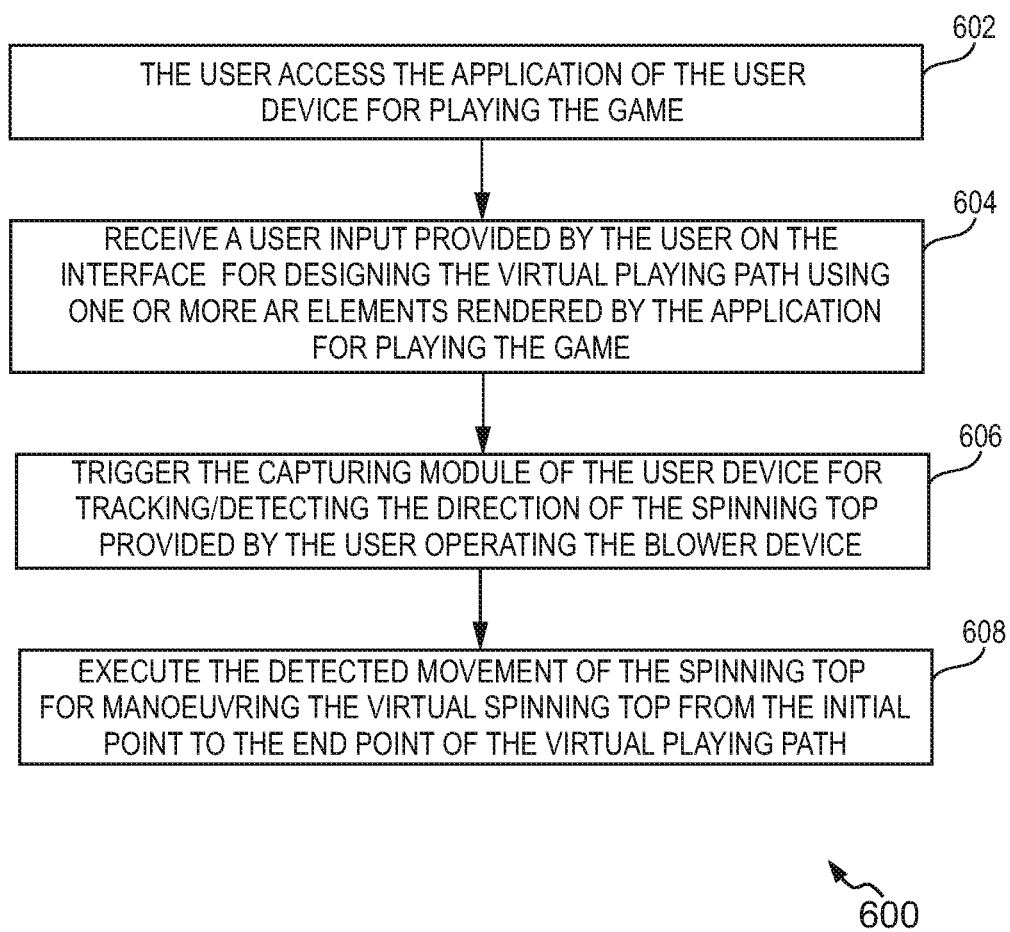
FIG. 6 is a flow diagram for playing the spinning top toy game in the application of the user device, in accordance with an example embodiment of the present disclosure.

Various embodiments of the present invention for playing the spinning top toy game are explained in a detailed manner, herein with reference to FIGS. 1A-1B to FIG. 6.

FIGS. 1A and 1B in one exemplary embodiment of the present disclosure, illustrate environments 100 and 150 for a spinning top toy game. The environment 100 is depicted to include a user 102 for playing the spinning top toy game on a plane surface, such as a surface 112 and the environment 150 is depicted to include the user 102 playing the spinning top toy game using an application in a user device 120.

A spinning top 108 used as a gaming component for playing the spinning top toy game (hereinafter interchangeably referred to as 'game'). The spinning top 108 is configured with a groove (see, 306 of FIGS. 3A-3C) at a central portion of a top segment. The spinning top 108 is configured to achieve a rotational motion around a central axis X-X' upon driving air from a blower device 106. The rotational motion and the direction of movement of the spinning top 108 may be controlled by regulating the volume and velocity of air emerging from the blower device 106. The user 102 guides or manoeuvres the spinning top 108 along a physical playing path 114 (hereinafter referenced as 'playing path 114') created on a gaming board 104 by operating the blower device 106 for playing the game.

In an embodiment, the game is played by a single user, such as the user 102 (e.g., as shown in FIG. 1A). The user 102 may create the playing path 114 on the gaming board 104 using at least one pre-prepared section 116. The pre-prepared sections 116 are removably coupled to a top surface 104a of the gaming board 104 (e.g., as shown in FIG. 1A). Further, a playing path may be designed without the gaming board 104 which is explained further in detail.

The playing path 114 is customized by the user 102 such that the playing path 114 includes a starting point 114a and a finish point 114b. The starting point 114a and the finish point 114b may be defined by the user 102 based on the playing path 114 created on the gaming board 104. In one embodiment, the user 102 may include one or more obstacles (not shown in Figures) between the starting point 114a and the finish point 114b of the playing path 114. Further, the playing path 114 may be customized by the user 102 on the gaming board 104 in various configurations using the pre-prepared sections 116 as per feasibility and design requirement of the game. The user 102 may place the gaming board 104 with the playing path 114 or even the playing path 114 without the gaming board 104 on a plane surface, such as a surface 112 for playing the game.

The user 102 operating the blower device 106 provides rotational motion to the spinning top 108 placed at the starting point 114a upon driving air at the top segment of the spinning top 108. As such, the user 102 manoeuvres the spinning top 108 from the starting point 114a to the finish point 114b by suitably applying the air at the top segment from the blower device 106. Rotational motion and direction of movement of the spinning top 108 may be regulated by operating the blower device 106 which is explained later in detail. In an example scenario, the user 102 may create a new playing path upon manoeuvring the spinning top 108 from the starting point 114a to the finish point 114b of the playing path 114. In another example scenario, if the user 102 fails to manoeuvre the spinning top 108 to the finish point 114b of the playing path 114, the user 102 may attempt the game from the starting point 114a of the playing path 114 or the user 102 may resume the game from failure point as per instructions of the game.

Further, the game may be played by a plurality of users. Each user may play the game either individually on a turn basis, or multiple users may play the game together at one instance. In one form, the game may be played individually by each user of the plurality of users on the playing path 114 created on the gaming board 104. Each user of the plurality of users manoeuvres the spinning top 108 from the starting point 114a to the finish point 114b by operating the blower device 106 thereby completing the game. In this scenario, the time taken by each user of the plurality of users for completing the game may be recorded. As such, a user of the plurality of users may be decided as a winner based on the time taken for completing the game. In another form, the game may be played by the plurality of users simultaneously on a playing path (see, 512 of FIG. 5B). The playing path may be created separately for each user of the plurality of users on the gaming board and can be interconnected. Each of the plurality of users competing in the game manoeuvres the spinning top 108 from their respective starting point to finish point by operating respective blower devices 106. In an embodiment, the game may be played as combat among the plurality of users such that the winner may be decided based on a spin time of a spinning top, such as the spinning top 108 or forcing the spinning top of the opponent user off a playing path/arena.

Figure 2A:
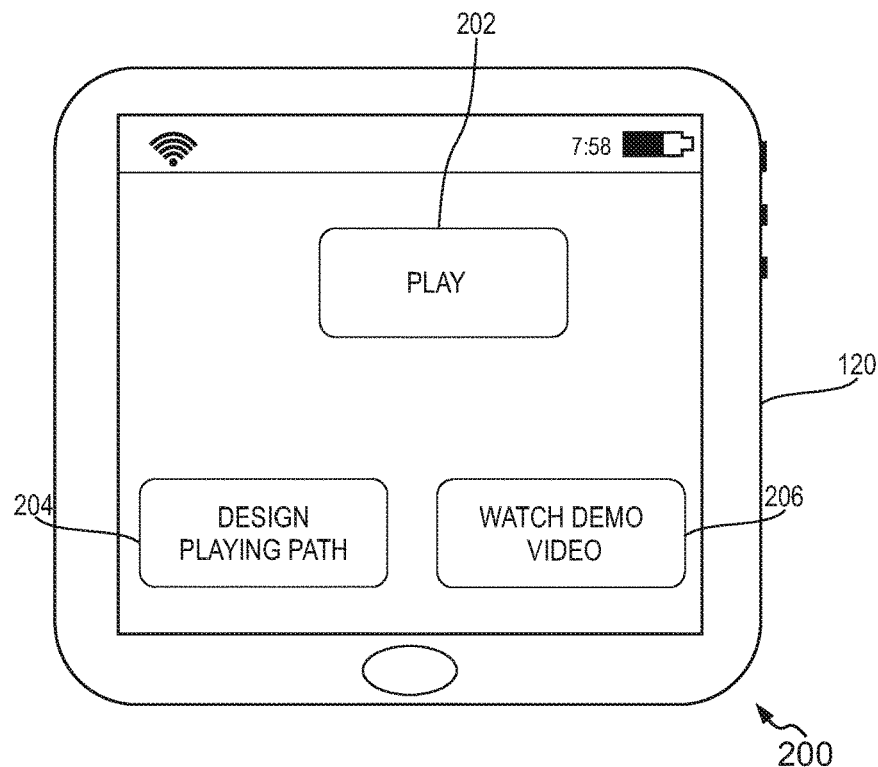
FIG. 2A illustrates an example representation of the interface displaying options in an application for playing the spinning top toy game, in accordance with an example embodiment of the present disclosure.

In an embodiment, the user 102 may use a user device 120 for playing the spinning top toy game (e.g., as shown in FIG. 1B). Some examples of the user device 120 may include, but not limited to, laptops, smartphones, desktops, tablets, wearable devices, workstation terminals, and the like. The user device 120 may be equipped with an instance of computer-implemented application 122 (hereinafter interchangeably referred to as 'application') installed therein. The application 122 may be an augmented reality (AR) application that allows the game to be played on the user device 120 by the user 102. The user 102 may be provided with an interface (for e.g., as shown in FIG. 2A) on the user device 120 upon accessing the application 122. The example interfaces displayed to the user 102 for playing the game are described with reference to FIGS. 2A-2C.

Figure 2B:
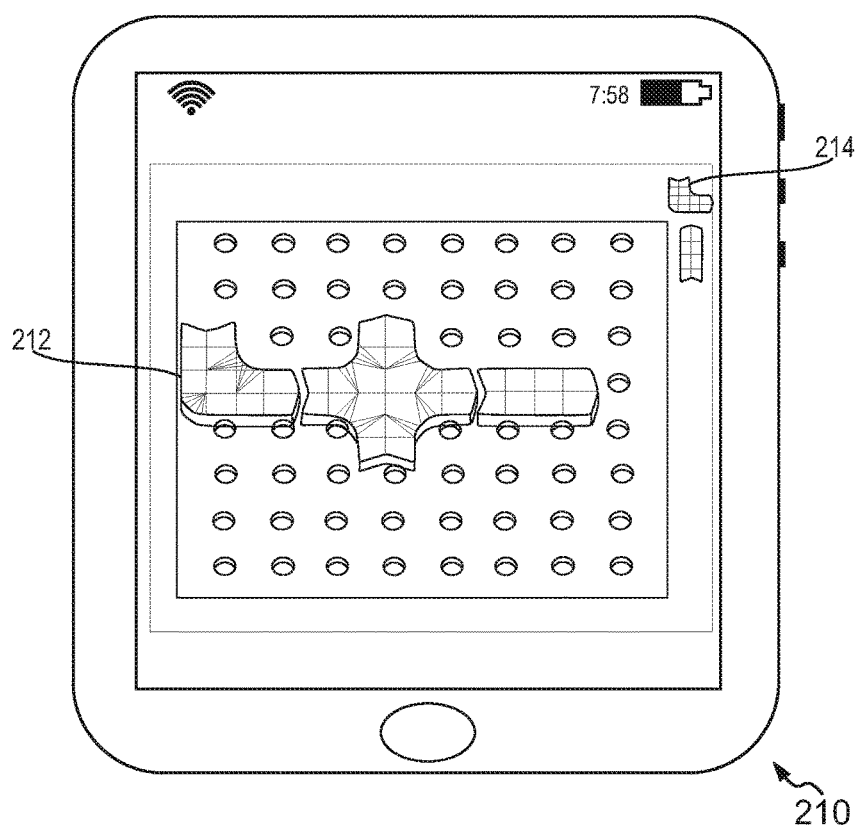
FIG. 2B illustrates an example representation of the interface for customizing a virtual playing path in an application for playing the spinning top toy game, in accordance with an example embodiment of the present disclosure.

The user 102 upon accessing the application 122 may create a virtual playing path for playing the game (for e.g., as shown in FIG. 2B). The virtual playing path may be created using one or more AR elements rendered by the application 122. Further, the user 102 may be provided with a pre-defined virtual playing path by the application 122 for playing the game based on the user input in the application 122.

Upon creation of the virtual playing path, a virtual spinning top (for e.g., see top 222 in FIG. 2C) is depicted on an initial point of the virtual playing path, and the virtual spinning top assumes a playing mode. In the playing mode, the user 102 manoeuvres the spinning top 108 on the flat or plane surface, such as surface 112 in a direction corresponding to the virtual playing path by operating the blower device 106. As such, the virtual spinning top is manoeuvred from the initial point to an endpoint of the virtual playing path. Further, there may be a communication link set up between the spinning top 108 and the user device 120, so that the actual motion of the spinning top 108 on the surface 112 can be tracked along the virtual playing path. In an embodiment, instead of or in addition to the communication link set up, an image capturing module of the user device 120 can also be utilized to track the movement of the spinning top 108 on the surface 112 to mimic the movement over the virtual playing path.

In at least one embodiment, the image capturing module of the user device 120 (e.g., a mobile phone with camera) is triggered in the playing mode for detecting the rotational motion and direction of the movement of the spinning top 108 on the surface 112. Upon detection by the image capturing module of the user device 120, the rotational motion and direction of movement of the spinning top 108 on the surface 112 is manipulated and such manipulation is also reflected in the movement of the virtual spinning top along the virtual playing path. For instance, the user 102 playing the game using the application 122 may operate the blower device 106 in one hand to manoeuvre the spinning top 108 and simultaneously detect the movement of the spinning top 108 by the image capturing module of the user device 120 held in other hand. Alternatively, the user device 120, for example, a mobile phone can be attached to the top of the blower device 106 such that the image capturing module of the user device 120 is exposed to constantly capture the motion of the spinning top 108, which is depicted in FIGS. 4D and 4E.

In an embodiment, the user 102 may create a new virtual playing path in the application 122 upon manoeuvring the virtual spinning top to the endpoint of the virtual playing path. In another embodiment, the user 102 may be provided with a new pre-defined virtual playing path by the application 122 upon manoeuvring the virtual spinning top to the endpoint of the pre-defined playing path. In another example scenario, if the user 102 fails to manoeuvre the virtual spinning top along the virtual playing path, the virtual spinning top may be directed to the initial point of the virtual playing path for the user 102 to retry the game or the user 102 may resume the game from failure point as per instructions of the game.

In another form, the game may be played by a plurality of users using the application 122. Each user of the plurality of users may connect their respective user device, such as the user device 120 using wireless LANs, Bluetooth, Wi-Fi and the like for playing the game. Each user may be at the same location or even at different locations. For the sake of brevity, various modes for playing the game such as single user or the plurality of users and selection of the winner is not described herein in detail.

Further, the complexity of the game varies based on the customization of the playing path 114 by the user 102. As such, various configurations of the playing path 114 may assume a complexity level of the game. Similarly, the user 102 playing the game 102 using the application 122 may be allowed to create a new virtual playing path of higher complexity than previously customized virtual playing path upon completion of the game. In another embodiment, the user 102 may be provided with a pre-defined virtual playing path upon completion of the game. In other words, the user 102 is allowed to play the game with different levels of complexity using the application 122.

Referring now to FIG. 2A, an example representation of the interface 200 displayed to the user 102 for playing the game, is shown, in accordance with an embodiment. In an example embodiment, the interface 200 is rendered by the application 122 at the user device 120 of FIG. 1B. The interface 200 is depicted to include options, such as an option 202, an option 204 and an option 206 provided to the user 102 upon accessing the application 122 for playing the game. The option 202 is associated with text 'PLAY' that provides an interface 220 for playing the game. Upon selection of the option 202, the user 102 may be provided with the pre-defined virtual playing path and directed to an interface 220 (shown in FIG. 2C) for playing the game. The option 204 is associated with text 'DESIGN PLAYING PATH'. Upon selection of the option 204, the user 102 is directed to an interface 210, where the user 102 can create the virtual playing path using the one or more AR elements rendered by the application 122. The option 206 is associated with text 'WATCH DEMO'. Upon selection of the option 206, the user 102 is provided with a demonstration video on how to play the game and creating the virtual playing path at the interface 200.

Referring now to FIG. 2B, an example representation of the interface 210 for creating the virtual playing path 212 for playing the game is shown, in accordance with an example embodiment of the present disclosure. The user 102 customizes the virtual playing path 212 by using one or more AR elements 214 rendered by the application 122. The virtual playing path 212 may be customized in various ways for playing the game as per feasibility and requirement. The user 102 may provide at least a touch input, voice input and a gesture input for the one or more AR elements 214 to customize the virtual playing path 212. Upon creation of the virtual playing path 212, the user 102 is directed to the next interface, which is shown next with the reference to FIG. 2C.

Figure 2C:
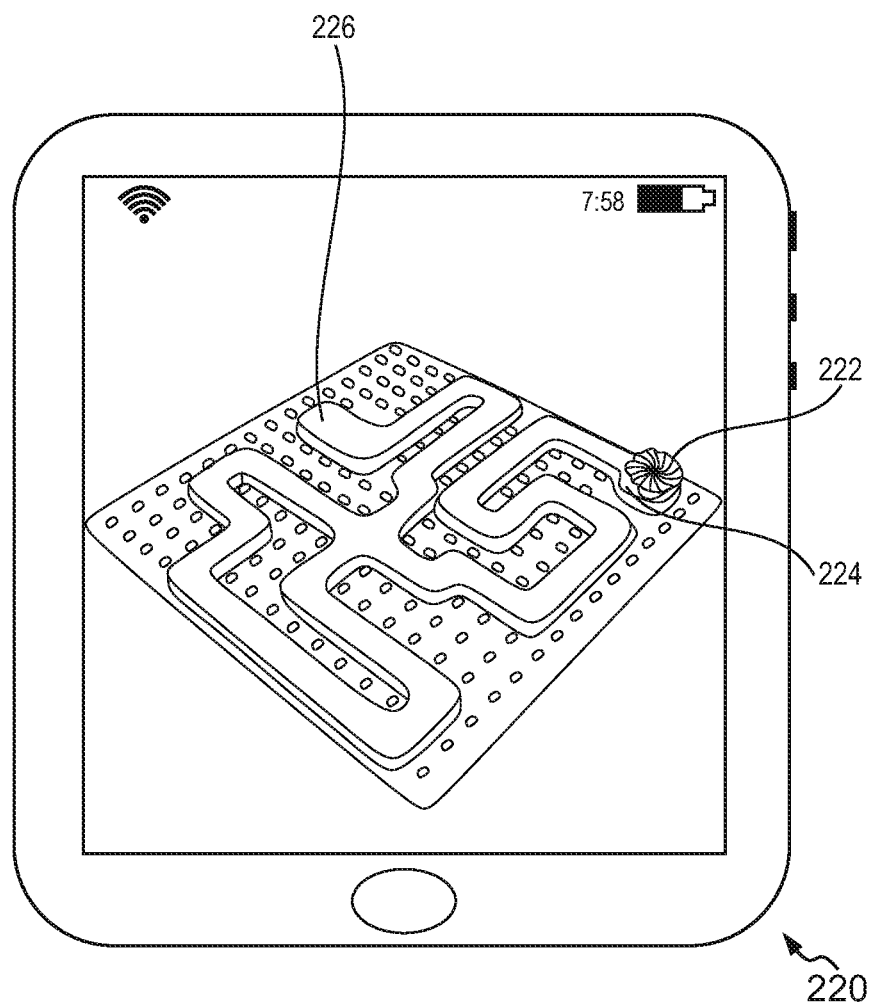
FIG. 2C illustrates an example representation of the interface displaying the virtual playing path for playing the spinning top toy game, in accordance with an example embodiment of the present disclosure.

Referring now to FIG. 2C, an example representation of the interface 220 depicting the virtual playing path 212 and the virtual spinning top 222 for playing the game is shown, in accordance with an example embodiment. In an embodiment, the virtual playing path 212 may be the pre-defined virtual playing path provided by the application 122. As shown in the interface 220 of FIG. 2C, the virtual spinning top 222 is placed at the initial point 224 of the virtual playing path 212 and the playing mode is initiated. In the playing mode, the image capturing module of the user device 120 is triggered for detecting the rotational motion and the direction of movement of the spinning top 108 provided by the user 102 on surface 112 by operating the blower device 106. The rotational motion and the direction of movement of the spinning top 108 on the surface 112 detected by the image capturing module is manipulated by the virtual spinning top 222 for manoeuvring along the virtual playing path 212. In other words, the virtual spinning top 222 experiences the rotational motion, and is manoeuvred along the virtual playing path 212 based on the corresponding movement of the spinning top 108 on the surface 112.

Figure 3A:
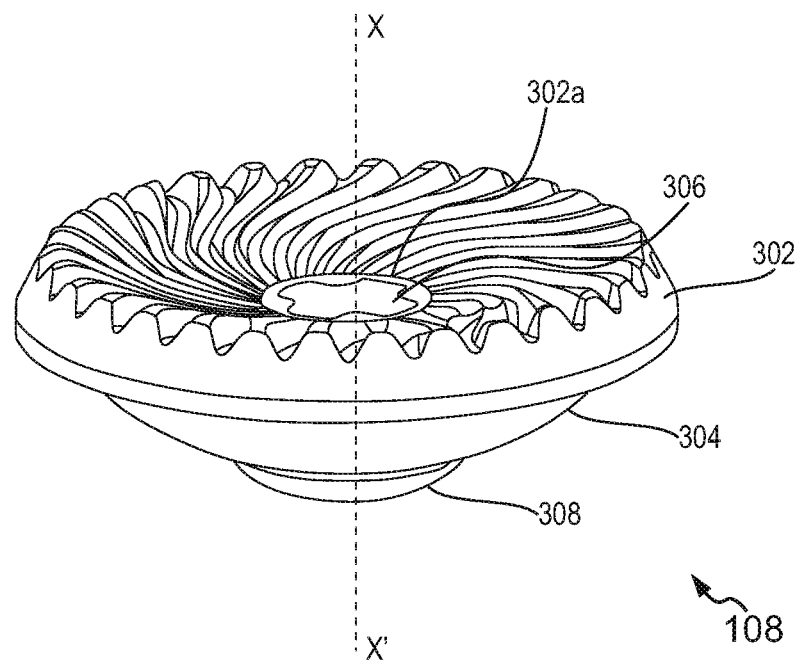
FIG. 3A is a schematic view of a spinning top for playing the spinning top toy game, in accordance with an example embodiment of the present disclosure.
Figure 3B:
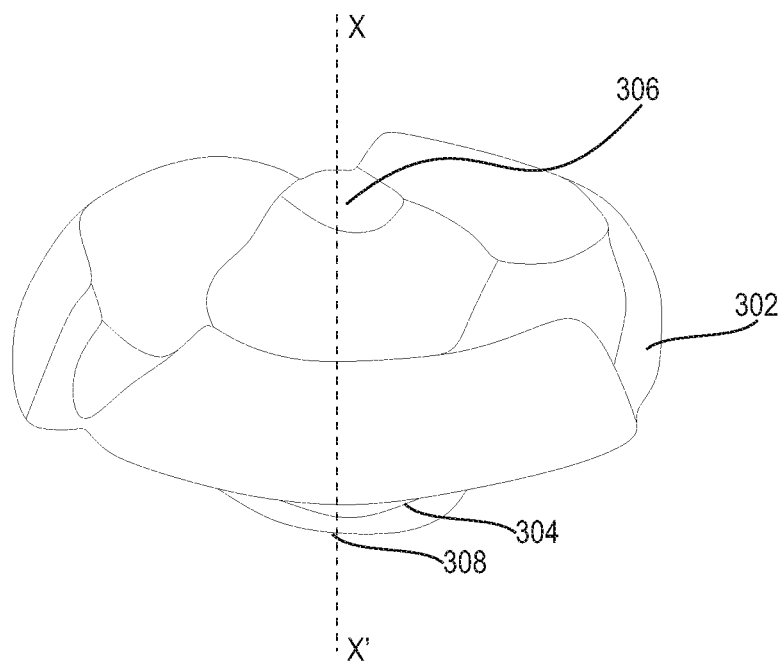
FIG. 3B is a schematic view of the spinning top for playing the spinning top toy game, in accordance with another example embodiment of the present disclosure.
Figure 3C:
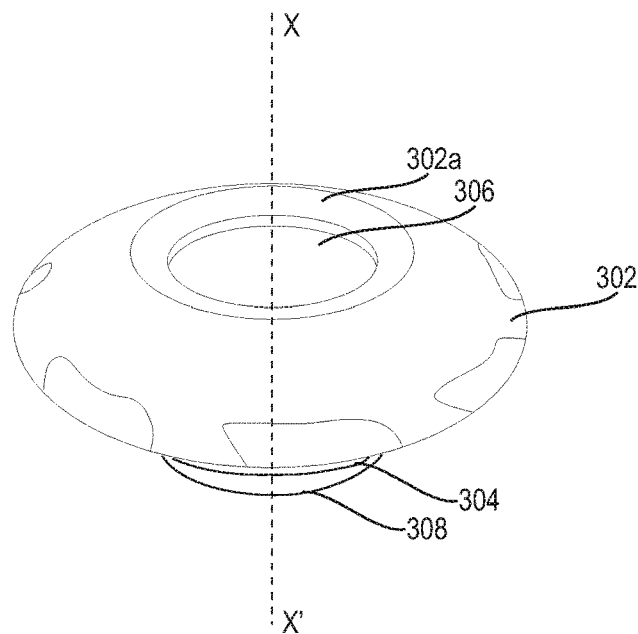
FIG. 3C is a schematic view of the spinning top for playing the spinning top toy game, in accordance with another example embodiment of the present disclosure.

Referring now to FIGS. 3A-3C, schematic views of the spinning top 108 used for playing the game, are shown, in accordance with some embodiments. The spinning top 108 is used as the gaming component for playing the game. The spinning top 108 is configured to achieve the rotational motion around the central axis X-X' thereof. The shape and configuration of the spinning top 108 (as shown in FIGS. 3A-3C) achieving the rotational motion conforms to a rotational symmetry around the central axis X-X'. The rotational motion of the spinning top 108 persists as long as the blower device 106 drives air on the top segment 302 of the spinning top 108.

In one configuration, the spinning top 108 may be a unibody construction including the top segment 302 and a bottom segment 304. In another configuration, the spinning top 108 may be fabricated using a plurality of segments such that the top segment 302 and the bottom segment 304 are removably coupled to each other suitably. The top segment 302 is dimensioned corresponding to the dimensions of the bottom segment 304 for a balanced rotational motion of the spinning top 108 due to its rotational inertia. Further, each of the top segment 302 and the bottom segment 304 of the spinning top 108 is symmetric around the central axis X-X'. The central axis X-X' may be a rotation axis which is also a symmetry axis of the spinning top 108.

When the blower device 106 provides air to the top segment 302 of the spinning top 108, the top segment 302 is configured to drive air around the central axis X-X' which determine the direction of rotation of the spinning top 108. The shape and configuration of the top segment 302 are explained further in detail. Further, the top segment 302 of the spinning top 108 include the groove 306 at the central portion 302a around the central axis X-X'. The shape of the groove 306 may be selected to one of V-shape, W-shape, U-shape and square shape or any other shape as per design feasibility and requirement. In addition, the central portion 302a of the top segment 302 may be recessed. In other words, the dimension of the central portion 302a of the top segment 302 is lesser or smaller than the dimension of the spinning top 108. In one embodiment, the central portion 302a may be selected to one of crater shape or a bulge shape as per design feasibility and requirement. Further, the central portion 302a of the top segment 302 may be designed as engraved chambers, lowered central portion or raised central portion and the like for improvising the rotational motion, guidance and control of the spinning top 108.

Further, the bottom segment 304 of the spinning top 108 may be a conical section (e.g. as shown in FIG. 3A-3C). The bottom segment 304 may include a blunt end 308 which is configured for serving as a spinning point (i.e., rotational motion) of the spinning top 108 on the surface 112. In one configuration, the bottom segment 304 may be provided with a point base tip, a peg and the like for serving as the spinning point.

The rotational motion of the spinning top 108 is achieved by driving air on the top segment 302 by operating the blower device 106. The air impacting on the top segment 302 creates sufficient air pressure on the top segment 302 thereby achieving the rotational motion of the spinning top 108. Further, the rotational motion of the spinning top 108 is managed by tilting the blower device 106 or moving it in height, width and length as per requirement. The rotational motion of the spinning top 108 depends on the velocity of the air blown from the blower device 106 which is explained further in detail.

Figure 3D:
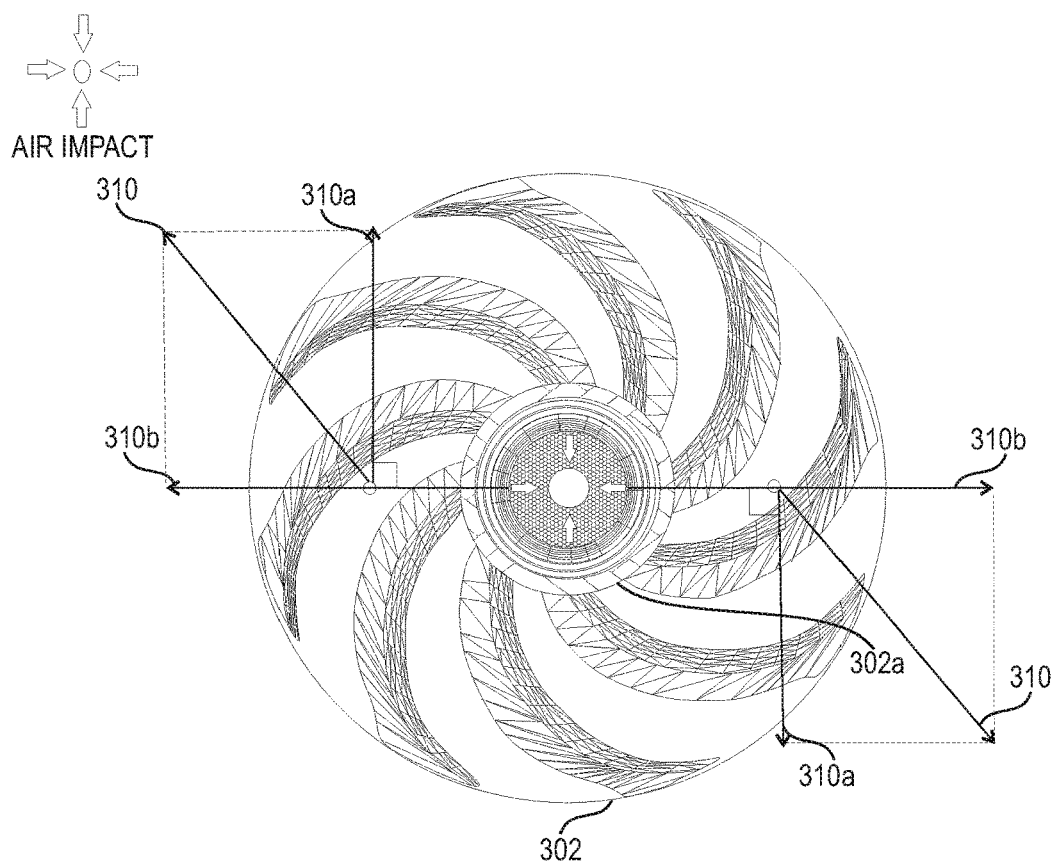
FIG. 3D is a schematic representation showing airflow on the top segment of the spinning top for providing a rotational motion to the spinning top, in accordance with an example embodiment of the present disclosure.

Referring to FIG. 3D in conjunction with FIG. 3A, the rotational motion of the spinning top 108 depends on the velocity of air blown on the top segment 302. As shown in FIG. 3D, the air is driven on the top segment 302 of the spinning top 108 by operating the blower device 106. Thus, the central portion 302a of the top segment 302 experiences a velocity (see, 310). The velocity 310 of the air at the central portion 302a defines the radial direction of the spinning top 108. Further, the velocity 310 of the air blown at the central portion 302a splits into two perpendicular components. The two perpendicular components are—a perpendicular velocity component 310a configured to enable the rotational motion or a stabile spinning of the spinning top 108, and a radial velocity component 310b configured to control the spinning top 108 on the surface 112. Thus, the air blown at the central portion 302a creates a dominant effect of the perpendicular velocity component 310a over the radial velocity component 310b. As such, the spinning top 108 achieves the rotational motion around the central axis X-X' due to dominant effect of the perpendicular velocity component 310a which results in conserved angular momentum. In other words, the rotational motion of the spinning top 108 is achieved upon driving air to the central portion 302a of the spinning top 108 which nullifies the effect of the radial velocity component 310b.

In one implementation, the two perpendicular components are connected with force components using classical mechanics comprising concepts such as but not limited to momentum, jet force and Bernoulli's equation. Thus, a perpendicular force component and a radial force component exhibit analogous characteristics of perpendicular velocity component and radial velocity component respectively. As such, the force components impacting on the top segment 302 creates a sufficient air pressure which enables the rotational motion and to control the spinning top 108.

Further, the force components of every point of air on the top segment 302 of the spinning top 108 add up to the total value of all force components. Thus, it implies that the effect of force component on the spinning top 108 is added up along every point on the top segment 302 of the spinning top 108 which offers the overall force.

Figure 3E:
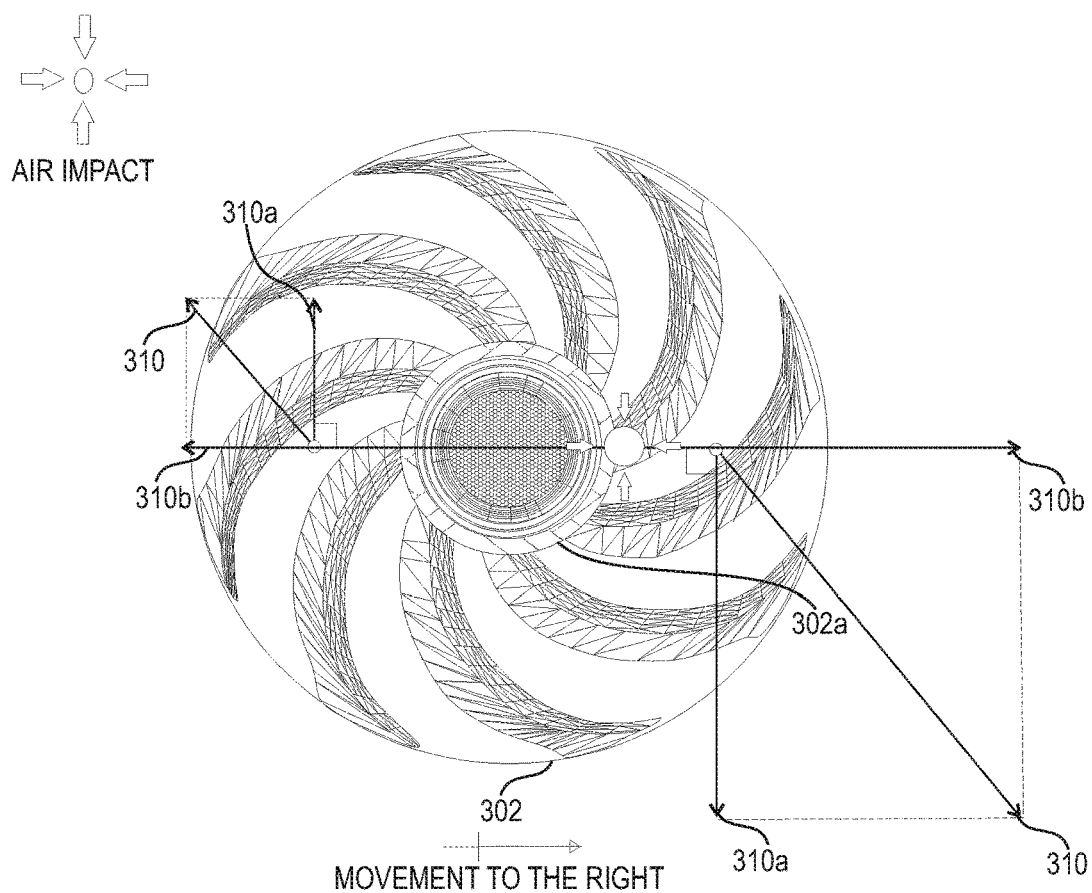
FIG. 3E is a schematic view of airflow on the top segment for controlling and manoeuvring of the spinning top, in accordance with an example embodiment of the present disclosure.

Referring to FIG. 3E in conjunction with FIG. 3A, the direction of movement and control of the spinning top 108 depends on the velocity of air blown on the top segment 302. As shown in FIG. 3E, the air is blown towards the edge of the top segment 302 or blown slightly away from the central portion 302a of the spinning top 108. Thus, the airflow away from the central portion 302a of the spinning top 302 is at a faster rate thereby resulting the velocity 310 at the point where the air is impacted on the top segment 302 to be dominant compared to the velocity 310 at other points of the top segment 302. Further, the two velocity components also become dominant corresponding to the velocity 310 at the point where the air is impacted on the top segment 302. Thus, the direction of movement and control of the spinning top 108 is achieved based on the point where the air is impacting on the top segment 302 and dominant effect of the radial velocity component 310b. For instance, if the air is impacted onto right side of the top segment 302 of the spinning top 108 (e.g., as shown in FIG. 3E), the velocity 310 at that point becomes dominant compared to the other point of the top segment 302. As such, the radial velocity component 310b at that point prevails the perpendicular velocity component 310a, thereby resulting in the spinning top 108 to move towards the right direction. In other words, the radial force component impacting on the top segment 302 creates a sufficient air pressure which enables the direction of movement and control of the spinning top 108. Similarly, the spinning top 108 may be allowed to move in various directions upon driving the air suitably on the top segment 302 corresponding to the direction of movement.

Figure 3F:
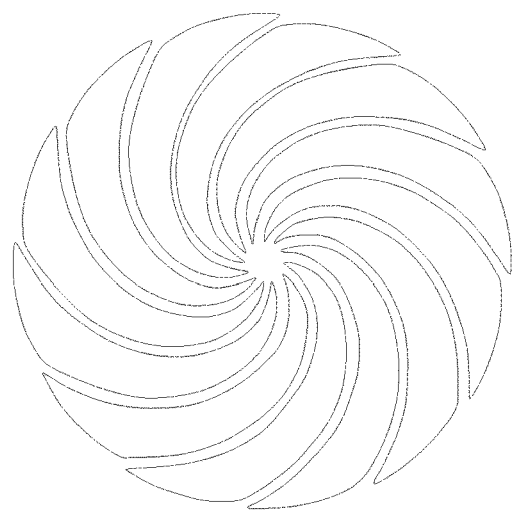
FIG. 3F is a schematic view of airflow of the spinning top of FIG. 3A, in accordance with another example embodiment of the present disclosure.
Figure 3G:
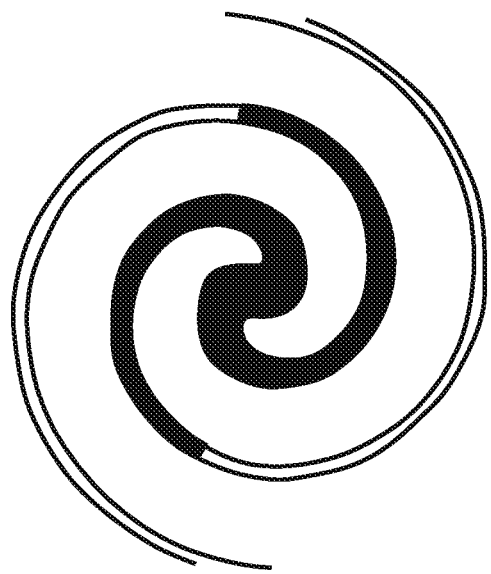
FIG. 3G is a schematic view of airflow of the spinning top of FIG. 3B, in accordance with another example embodiment of the present disclosure.
Figure 3H:
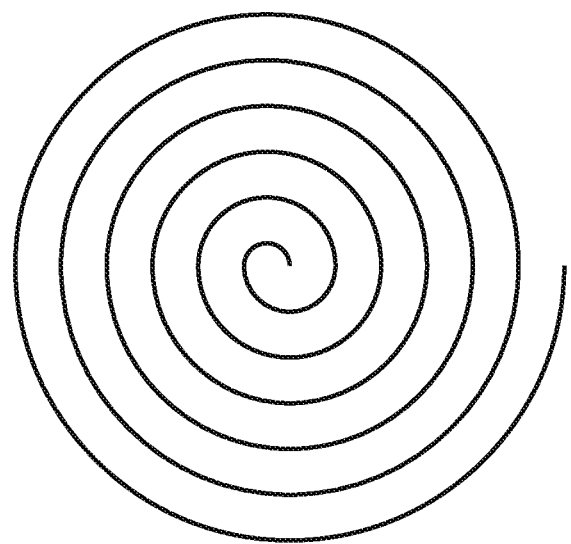
FIG. 3H is a schematic view of airflow of the spinning top of FIG. 3C, in accordance with another example embodiment of the present disclosure.

In an embodiment, the air pressure created for achieving rotational motion and the direction of movement of the spinning top 108 may vary based on the shape and configuration of the top segment 302. In one configuration, the shape of the top segment 302 may be a spiral shape (e.g., as shown in FIG. 3A), such that the airflow on the top segment 302 (e.g., as shown in FIG. 3F) creates the sufficient air pressure thereby accelerating the spinning top 108 to achieve the rotational motion. In another configuration, the shape of the top segment 302 may be a propeller shape (e.g., as shown in FIG. 3B) such that the airflow on the top segment 302 (e.g., as shown in FIG. 3G) the creates sufficient air pressure thereby accelerating the spinning top 108 to achieve the rotational motion. In another configuration, the shape of the top segment 302 may be a windmill shape (e.g., as shown in FIG. 3C) such that the airflow on the top segment 302 (e.g., as shown in FIG. 3H) creates the sufficient air pressure thereby accelerating the spinning top 108 to achieve the rotational motion. Further, the shape and configuration of the top segment 302 may be altered as per design feasibility and requirement. Moreover, the radial direction of the spinning top 108 is determined based on the shape and configuration of the top segment 302 of the spinning top 108.

Figure 4A:
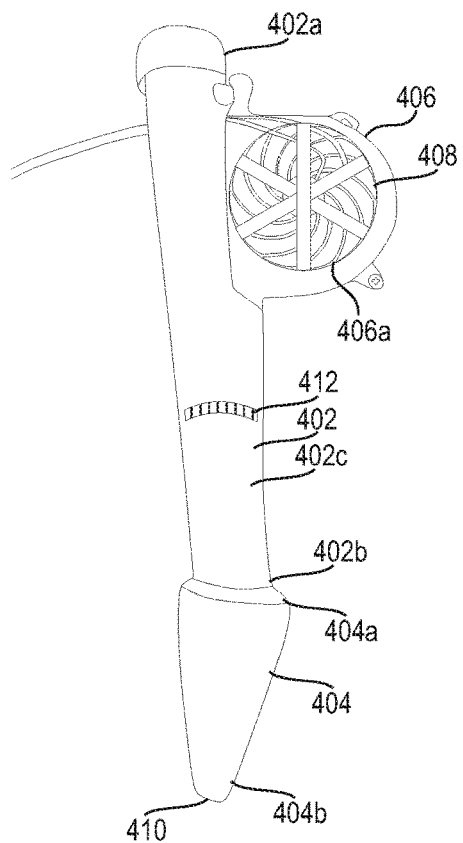
FIG. 4A is a schematic view of a blower device for playing the spinning top toy game, in accordance with an example embodiment of the present disclosure.
Figure 4B:
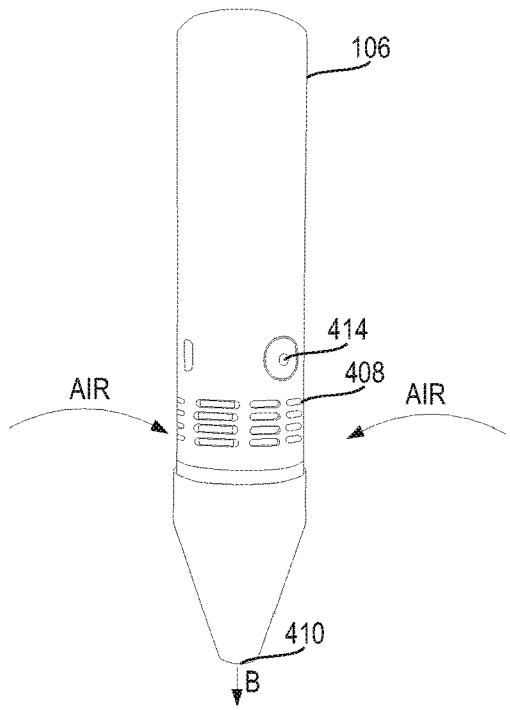
FIG. 4B is a schematic view of the blower device for playing the spinning top toy game, in accordance with another example embodiment of the present disclosure.

FIGS. 4A-4B, illustrate perspective views of the blower device 106, in accordance with an exemplary embodiment. The blower device 106 is configured to drive air on the top segment 302 of the spinning top 108 for providing the rotational motion and control of the spinning top 108.

The blower device 106 includes a frame member 402 with a proximal portion 402a and a distal portion 402b. The frame member 402 is configured to encompass the internal components of the blower device 106. Typically, the frame member 402 may be a cylindrical cross-section. However, the shape and configuration of the frame member 402 may be selected as any of square, rectangular or any other shape as per design feasibility and requirement.

The blower device 106 includes a chute member 404 configured with a tapered profile extending from a top portion 404a to a bottom portion 404b and conforms to a conical frustum structure (e.g., as shown in FIGS. 4A-4B). The top portion 404a of the chute member 404 is coupled to the distal portion 402b of the frame member 402. The chute member 404 is coupled to the frame member 402 via conventional means such as adhesive bonding, a fastening, or the like as per feasibility and requirement. The chute member 404 is dimensioned corresponding to the dimensions of the frame member 402.

In one configuration, a blower fan module 406 may be mounted externally to an outer surface 402c and positioned adjacent to the proximal portion 402a of the frame member 402 (e.g., as shown in FIG. 4A). In this scenario, the air is drawn from the spacing 406a of the blower fan module 406. As such, the spacing 406a is configured to assume an air inlet port 408 of the blower device 106. Further, the blower device 106 includes an air outlet port 410 at the bottom portion 404b of the chute member 404.

In another configuration, the blower fan module 406 may be an integral component of the blower device 106 such that the blower fan module 406 may be mounted inside the frame member 402. In this scenario, the distal portion 402b of the frame member 402 is configured to assume the air inlet port 408 (e.g., as shown in FIG. 4B). Moreover, mounting the blower fan module 406 inside the frame member 402, provides a clean and refreshed exterior look and feel of the blower device 106, thereby enhancing the aesthetic appeal.

The blower device 106 is operated by the press of a push button 414, which upon actuation powers the blower device 106. In other words, the blower fan module 406 is actuated upon operating the push button 414. Upon actuation, the blower fan module 406 is configured to draw air from the air inlet port 408 and emanates the air from the air outlet port 410. Further, the blower device 106 is powered either by plugging the blower device 106 to an external power supply or by a rechargeable battery installed within the blower device 106.

Figure 4C:
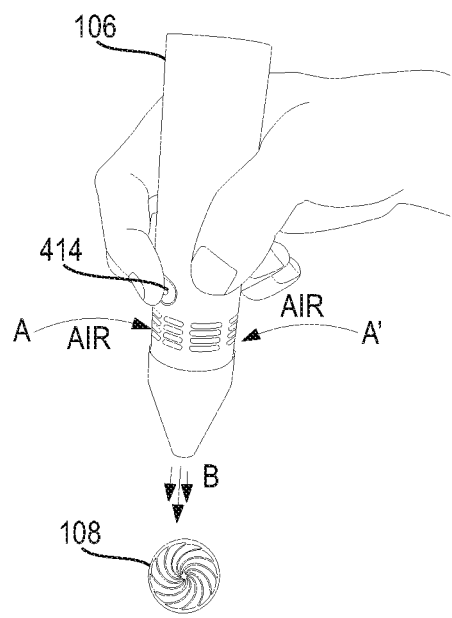
FIGS. 4C, 4D and 4E illustrate utilization of blower device for playing in spinning top, in accordance with some embodiments of the present disclosure.
Figure 4D:
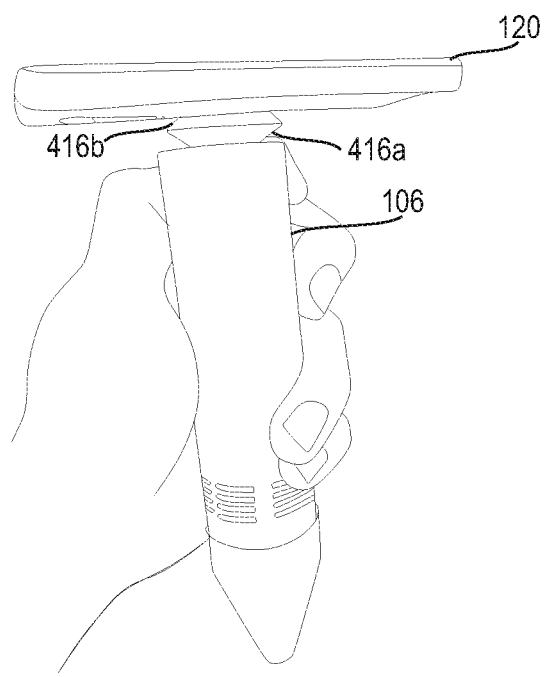
Figure 4E:
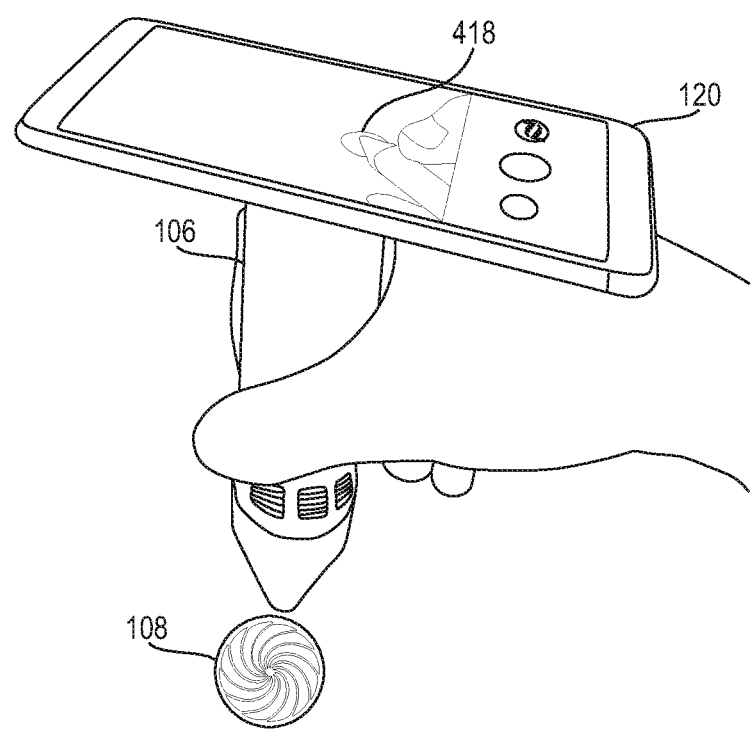

The push button 414 is shown in FIG. 4C, wherein the direction of the inlet air is shown by arrows A, A' and outlet air is shown by arrow B emanating from the air outlet port 410. The user 102 playing the game manoeuvres the spinning top 108 by operating the blower device 106 which drives air through the air outlet port 410 onto the top segment 302 of the spinning top 108. The air driven on the top segment 302 creates the air pressure which enables the spinning top 108 to achieve the rotational motion is explained above with reference to FIGS. 3D and 3E. The air pressure created on the top segment 302 is based on the velocity of the air emanating from the air outlet port 410. Once the rotational motion is achieved, the spinning top 108 can be manoeuvred on the surface 112 by suitably operating the blower device 106.

Further, the blower device 106 may include a controlling means 412 configured to regulate the volume and velocity of the air emerging from the air outlet port 410. The controlling means 412 may include an electronic circuitry mounted to the frame member 402 therein (not shown in Figures). The user 102 may operate the controlling means 412 for regulating the volume and velocity of the air emerging from the air outlet port 410. In other words, the user 102 playing the game may regulate the rotational motion and control the direction of movement of the spinning top 108 based on either the physical playing path 114 or the virtual playing path 212 or on the surface 112. In an embodiment, the volume of air applied on the spinning top 108 can be modulated based on the pressure applied on the push button 414. In an embodiment, the push button 414 may assume to a controlling means 412 of the blower device 106. As such, the push button 414 has analogous functionality of the controlling means 412 of the blower device 106. Alternatively, a dial or rotary knob (not shown) can be set to various levels to control the volume and velocity of air emanating from the air outlet port 410 In one implementation, the blower device may be designed in various configurations such as but not limited to a gun type, handle type, a hose type and a saber type as per design feasibility and requirements.

In an embodiment, the blower device 106 includes a first attachment member 416a coupled with the proximal portion 402a of the blower device 106. The first attachment member 416a is configured such that it can be coupled with a second attachment member 416b configured or attached with the user device 120. An example of the first and second attachment members 416a and 416b respectively can be magnetic members, or complementary attachment means designed as per feasibility. One such representation of the user device 120 attached with the blower device 106 is shown in FIG. 4D. The user device 120 is attached with the blower device 106 such that the image capturing module of the user device 120 is exposed to capture images, videos of the spinning top 108 during the movement of the spinning top 108. An example illustration of the captured movement of the spinning top 108 on virtual space (e.g., see, 418) is shown in FIG. 4E.

Figure 5A:
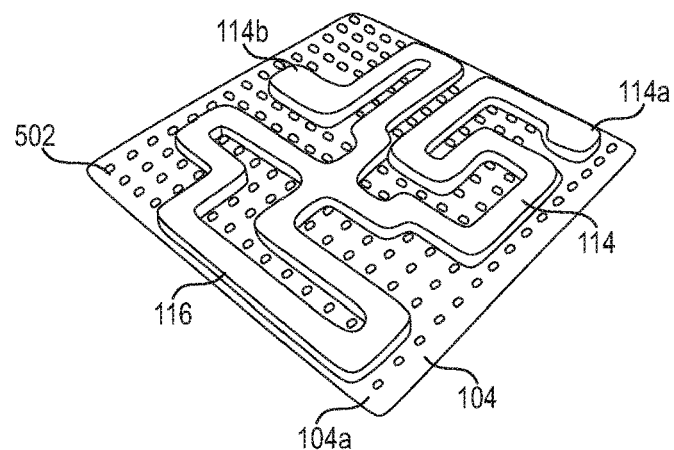
FIG. 5A is a schematic view of a physical playing path configured on a gaming board for playing the spinning top toy game, in accordance with an example embodiment of the present disclosure.

Referring now to FIG. 5A, the playing path 114 for playing the game is shown in accordance with an example embodiment of the present disclosure. The playing path 114 is created using at least one pre-prepared section 116 on the gaming board 104. The gaming board 104 may be configured with a plurality of slot members 502 at regular intervals on the top surface 104a. Each pre-prepared section 116 may include engagement members (not shown in Figures) such that the playing path 114 is created upon coupling the engagement members to the slot members 502 of the gaming board 104. Moreover, the engagement members of the pre-prepared sections 116 are dimensioned corresponding to the slot members 502 of the gaming board 104. In one embodiment, the playing path 114 may be customized in a plurality of ways by engaging the engagement members of the pre-prepared sections 116 to the slot members 502 as per feasibility and requirement.

Figure 5B:
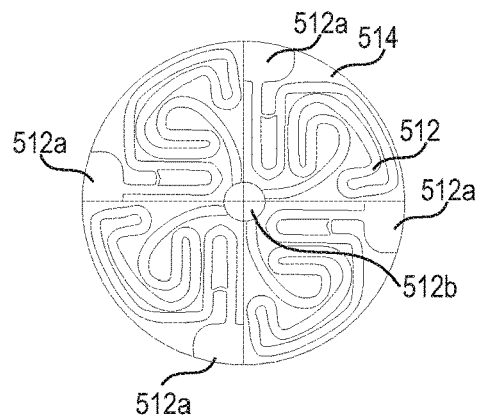
FIG. 5B is a schematic view of the physical playing path configured on a gaming board for playing the spinning top toy game, in accordance with another example embodiment of the present disclosure.

Further, the playing path 512 may be designed for the plurality of users on the gaming board 514 using the pre-prepared sections 116 (e.g. as shown in FIG. 5B) for playing the game. The playing path 512 may be designed separately for each user of the plurality of users on the gaming board 514. For instance, the playing path 512 may include multiple interconnected playing paths (e.g., 4 playing paths in 4 quadrants as shown in FIG. 5B), where each playing path can be utilized by an individual user. As such, the playing path 512 for the plurality of users includes a separate starting point 512a for each user, and a common finish point 512b for the plurality of users. Each of the plurality of users competing in the game manoeuvres the spinning top 108 from their respective starting point 512a to the finish point 512b by operating the blower device 106 onto the respective spinning top 108.

Figure 5C:
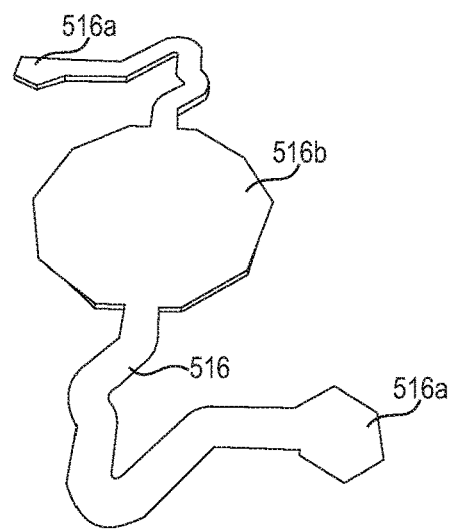
FIG. 5C is a schematic view of the physical playing path without the gaming board for playing the spinning top toy game, in accordance with another example embodiment of the present disclosure.

In another embodiment, a playing path 516 may be designed for the plurality of users without the gaming board 514. The playing path 516 is designed using pre-prepared sections 116 (e.g. as shown in FIG. 5C) and placed on the plane surface, such as the surface 112 for playing the game. As such, the playing path 516 for the plurality of users includes a separate starting point 516a for each user, and a common finish point 516b for the plurality of users. Each of the plurality of users competing in the game manoeuvres the spinning top 108 from their respective starting point 516a to the finish point 516b by operating the blower device 106 onto the respective spinning top 108. Further, the game may be played as a combat where each user competes for reaching the finish point 516b and/or knocking the spinning top of the opponent user off the finish point 516b of the playing path 516.

Figure 5D:
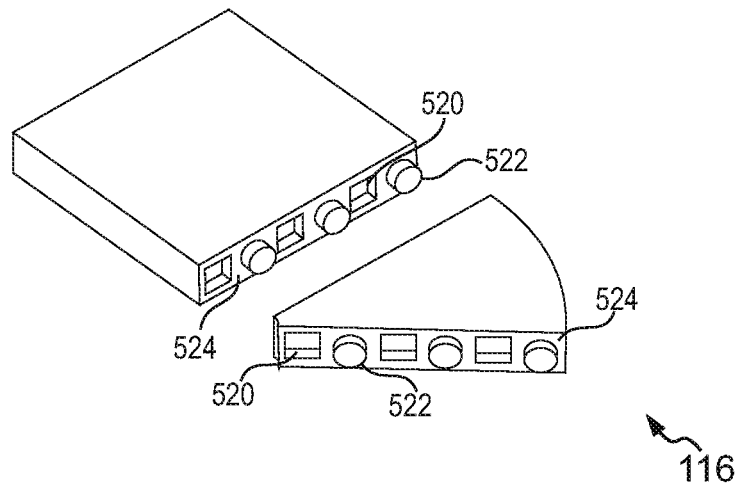
FIG. 5D is a schematic view of pre-prepared sections used for designing the physical playing path of FIG. 5C for playing the spinning top toy game, in accordance with another example embodiment of the present disclosure.

In one implementation, each pre-prepared section of the pre-prepared sections 116 may include a plurality of slot members 520 and a plurality of engagement members 522 positioned alternatively at regular intervals on at least one side surface 524 (e.g., as shown in FIG. 5D). The arrangement of the plurality of slot members 520 and the plurality of engagement members 522 on the side surface 524 may vary as per design feasibility and requirement. Thus, the playing path 516 is designed by removably coupling the pre-prepared sections 116 which engages the plurality of engagement members 522 with the plurality of slot members 520.

In one embodiment, the playing path 516 may be designed for a single user (not shown in Figures) using the pre-prepared sections 116, such as the playing path 114 of FIG. 5A for playing the game.

Figure 5E:
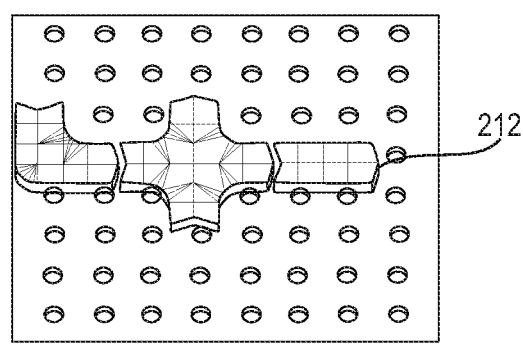
FIG. 5E is a schematic view of gaming board of FIG. 2B, for playing the spinning top toy game, in accordance with an example embodiment of the present disclosure.

In one embodiment, the user 102 creates the virtual playing path 212 in the application 122 for playing the game (e.g., as shown in FIG. 5E). The virtual playing path 212 is created using the one or more AR elements 214 rendered by the application 122. In the playing mode, the user 102 manoeuvres the spinning top 108 on the surface 112 by operating the blower device 106 which results in manoeuvring of the virtual spinning top 222 along the virtual playing path 212.

FIG. 6 in one exemplary embodiment of the present disclosure is a flow diagram illustrating a method 600 for playing the spinning top toy game. The method 600 starts with 602 when the user 102 accesses the application 122 of the user device 120 for playing the game.

At operation 604, the method 600 includes receiving a user input provided by the user 102 for designing the virtual playing path 212 using the application 122 for playing the game. The user 102 is provided with an interface, such as the interface 210 for designing the virtual playing path 212 upon selection of the option 204 (see, FIG. 2A). The user 102 design the virtual playing path 212 by using the one or more AR elements 214 rendered by the application 122. Upon designing the virtual playing path 212, the user 102 is directed to the interface 220 (see, FIG. 2C) to start the playing mode.

At operation 606, the method 600 includes triggering the image capturing module of the user device 120 for tracking/detecting the direction of the spinning top 108 provided by the user 102 operating the blower device 106. The user 102 manoeuvres the spinning top 108 on the surface 112 corresponding to the virtual playing path 212 by operating the blower device 106. The movement of the spinning top 108 is detected upon triggering the image capturing module of the user device 120.

At operation 608, the method 600 includes executing the detected movement of the spinning top 108 for manoeuvring the virtual spinning top 222 from the initial point 224 to the endpoint 226 of the virtual playing path 212. In the playing mode, the user 102 manoeuvres the spinning top 108 on the surface 112 in a direction corresponding to the virtual playing path 212. As such, the direction of the spinning top 108 is executed in the application 122 which manoeuvres the virtual spinning top 222 corresponding to the movement of the spinning top 108.

Various embodiments of the present disclosure offer apparatuses and methods for playing the spinning top toy game, where the spinning top is used as the gaming component. In at least one embodiment, the user may play the game using a computer-implemented application on the user device, in which the user is provided with an AR experience by playing the game using the application. In an embodiment, the user may play the game by creating the playing path using the pre-prepared sections on the gaming board. The blower device and the spinning top may be configured in a variety of ways, as described with various embodiments herein in the present disclosure.

The benefits and advantages described above may relate to one embodiment or may relate to several embodiments. The embodiments are not limited to those that solve any or all of the stated problems or those that have any or all of the stated benefits and advantages.

The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification. The above description is given by way of example only and various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

What is claimed is:

1. A gaming apparatus, comprising:
   a playing path for playing a spinning top toy game by a user, wherein the playing path comprises at least one of:
   a virtual playing path configured in a computer-implemented application of a user device, and
   a physical playing path configured by using at least one pre-prepared section,
   a spinning top comprising a top segment and a bottom segment, the top segment configured to drive air around a central axis of the spinning top thereby controlling radial direction of rotational motion of the spinning top, the bottom segment configured for serving as a spinning point of the spinning top relative to a surface; and
   a blower device comprising an air inlet port, an air outlet port, and a controlling means, the blower device configured to drive air to the spinning top through the air outlet port for providing the rotational motion and manoeuvring of the spinning top by the user,
   wherein the controlling means includes a push button to actuate the blower device, and the controlling means is configured to regulate volume and velocity of air emerging from the air outlet port of the blower device, and
   wherein the rotational motion of the spinning top is achieved upon driving air onto the top segment of the spinning top through the air outlet port of the blower device such that the air impacting the top segment creates air pressure due to velocity of the air at a central portion of the spinning top which results in the rotational motion of the spinning top around the central axis thereof.

2. The gaming apparatus as claimed in claim 1, wherein the virtual playing path further comprises an initial point and an endpoint, a virtual spinning top positioned at the initial point of the virtual playing path to start a playing mode, and wherein in the playing mode the user manoeuvres the spinning top on the surface in a direction corresponding to the virtual playing path by operating the blower device.

3. The gaming apparatus as claimed in claim 2, wherein in the playing mode, an image capturing module of the user device is triggered, the image capturing module configured to detect a direction of movement of the spinning top on the surface, and wherein detected movement of the spinning top is executed in the computer-implemented application thereby resulting in the rotational motion and manoeuvring of the virtual spinning top along the virtual playing path.

4. The gaming apparatus as claimed in claim 1, wherein the virtual playing path is configured using one or more augmented reality (AR) elements rendered on an interface of the computer-implemented application in the user device.

5. The gaming apparatus as claimed in claim 1, wherein the physical playing path is configured by at least:
   removably coupling the at least one pre-prepared section on a gaming board or a surface; and
   removably coupling the at least one pre-prepared section by engaging a plurality of engagement members with a plurality of slot members configured on at least one side surface of the at least one pre-prepared section.

6. The gaming apparatus as claimed in claim 5, wherein the physical playing path further comprises a starting point and a finish point, and wherein the user manoeuvres the spinning top from the starting point to the finish point of the physical playing path by operating the blower device.

7. The gaming apparatus as claimed in claim 1, wherein the spinning top further comprises a groove at the central portion of the top segment, and wherein the spinning top achieving the rotational motion conforms to a rotational symmetry around the central axis thereof.

8. The gaming apparatus as claimed in claim 1, wherein manoeuvring of the spinning top is achieved upon operating the blower device which drives air towards edge of the top segment of the spinning top thereby resulting in the velocity of air blown at the edge of the top segment to increase which enables the spinning top to traverse.

9. The gaming apparatus as claimed in claim 1, wherein the blower device further comprises:
- a blower fan module configured to draw air through the air inlet port and emanate the air from the air outlet port, and
- wherein the controlling means is further configured to control the rotational motion and the direction of movement of the spinning top based on operating the controlling means of the blower device.

10. A gaming apparatus for a spinning top toy game, comprising:
- a playing path for playing the spinning top toy game by a user, wherein the playing path comprises at least one of:
  - a virtual playing path configured in a computer-implemented application of a user device, wherein the virtual playing path is configured using one or more augmented reality (AR) elements rendered on an interface of the computer-implemented application in the user device, and
  - a physical playing path configured using at least one pre-prepared section,
- a spinning top comprising a top segment and a bottom segment, the top segment is configured to drive air around a central axis thereby controlling radial direction of a rotational motion of the spinning top, the bottom segment is configured for serving as a spinning point of the spinning top relative to a surface; and
- a blower device comprising an air inlet port, an air outlet port, and a controlling means, the blower device configured to drive air to the spinning top through the air outlet port for providing the rotational motion and manoeuvring of the spinning top by the user,
- wherein the controlling means includes a push button to actuate the blower device, and the controlling means is configured to regulate volume and velocity of air emerging from the air outlet port of the blower device,
- wherein, the rotational motion of the spinning top is achieved upon driving air onto the top segment of the spinning top through the air outlet port of the blower device such that the air impacting the top segment creates air pressure at a central portion of the spinning top which results in the rotational motion of the spinning top around the central axis thereof, and
- wherein, the manoeuvring of the spinning top is achieved upon operating the blower device which drives air towards edge of the top segment of the spinning top thereby resulting in the velocity of the air blown at the edge of the top segment to increase which enables the spinning top to traverse.

11. The gaming apparatus as claimed in claim 10, wherein the virtual playing path further comprises an initial point and an endpoint, a virtual spinning top is positioned at the initial point of the virtual playing path and assume to a playing mode, and wherein, in the playing mode the user manoeuvres the spinning top on the surface in a direction corresponding to the virtual playing path by operating the blower device.

12. The gaming apparatus as claimed in claim 11, wherein in the playing mode, an image capturing module of the user device is triggered, wherein the image capturing module is configured to detect the rotational motion and direction of movement of the spinning top on the surface, and wherein detected movement of the spinning top is executed in the computer-implemented application thereby resulting in the rotational motion and manoeuvring of the virtual spinning top along the virtual playing path.

13. The gaming apparatus as claimed in claim 10, wherein the physical playing path is configured by at least:
- removably coupling the at least one pre-prepared section on a gaming board or a surface; and
- removably coupling the at least one pre-prepared section by engaging a plurality of engagement members with a plurality of slot members configured on at least one side surface of the at least one pre-prepared section.

14. The gaming apparatus as claimed in claim 13, wherein the physical playing path further comprises a starting point and a finish point, and wherein the user manoeuvres the spinning top from the starting point to the finish point of the physical playing path by operating the blower device.

15. The gaming apparatus as claimed in claim 10, wherein the spinning top further comprises a groove at the central portion of the top segment, and wherein the spinning top achieving the rotational motion conforms to a rotational symmetry around the central axis thereof.

16. The gaming apparatus as claimed in claim 10, wherein the blower device further comprises:
- a blower fan module configured to draw air through the air inlet port and emanate the air from the air outlet port, and
- wherein the controlling means is further configured to control the rotational motion and the direction of movement of the spinning top based on operating the controlling means of the blower device.

17. A gaming apparatus for a spinning top toy game, comprising:
- a physical playing path for playing the spinning top toy game by a user, wherein the physical playing path is configured by at least:
  - removably coupling at least one pre-prepared section on a gaming board, and
  - removably coupling the at least one pre-prepared section by engaging a plurality of engagement members with a plurality of slot members configured on at least one side surface of the at least one pre-prepared section;
- a spinning top comprising a top segment and a bottom segment, the top segment configured to drive air around a central axis thereby controlling radial direction of rotational motion of the spinning top, the bottom segment is configured for serving as a spinning point of the spinning top relative to a surface; and
- a blower device comprising an air inlet port, an air outlet port, and a controlling means, the blower device configured to drive air to the spinning top through the air outlet port for providing the rotational motion and manoeuvring of the spinning top by the user,
- wherein the controlling means includes a push button to actuate the blower device, and the controlling means is configured to regulate volume and velocity of air emerging from the air outlet port of the blower device,
- wherein, the rotational motion of the spinning top is achieved upon driving air onto the top segment of the spinning top through the air outlet port of the blower device such that the air impacting the top segment creates air pressure relative to the surface due to velocity at a central portion of the spinning top which results in the rotational motion of the spinning top around the central axis thereof, and
- wherein, the manoeuvring of the spinning top is achieved upon operating the blower device which drives air towards edge of the top segment of the spinning top thereby resulting the velocity of the air blown at the edge of the top segment to increase which enables the spinning top to traverse.

18. The gaming apparatus as claimed in claim 17, wherein the physical playing path further comprises a starting point and a finish point, and wherein the user manoeuvres the spinning top from the starting point to the finish point of the physical playing path by operating the blower device.

19. The gaming apparatus as claimed in claim 17, wherein the spinning top further comprises a groove at the central portion of the top segment, and wherein the spinning top achieving the rotational motion conforms to a rotational symmetry around the central axis thereof.

20. The gaming apparatus as claimed in claim 17, wherein the blower device further comprises:
- a blower fan module configured to draw air through the air inlet port and emanate the air from the air outlet port, and
- wherein the controlling means is further configured to control the rotational motion and the direction of movement of the spinning top based on operating the controlling means of the blower device.

\* \* \* \* \*